United States Patent
Hannuksela et al.

(10) Patent No.: US 10,269,104 B2
(45) Date of Patent: Apr. 23, 2019

(54) METHOD AND APPARATUS FOR FUSING DISTANCE DATA FROM A DISTANCE SENSING CAMERA WITH AN IMAGE

(71) Applicant: Nokia Technologies Oy, Espoo (FI)

(72) Inventors: Miska Hannuksela, Tampere (FI); Mihail Georgiev, Tampere (FI); Atanas Gotchev, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 177 days.

(21) Appl. No.: 14/785,925

(22) PCT Filed: Apr. 29, 2013

(86) PCT No.: PCT/FI2013/050476
§ 371 (c)(1),
(2) Date: Oct. 21, 2015

(87) PCT Pub. No.: WO2014/177750
PCT Pub. Date: Nov. 6, 2014

(65) Prior Publication Data
US 2016/0086318 A1    Mar. 24, 2016

(51) Int. Cl.
*G06T 5/50* (2006.01)
*G01S 17/36* (2006.01)
*G01S 17/89* (2006.01)
*G01S 17/02* (2006.01)
*G06T 5/00* (2006.01)

(52) U.S. Cl.
CPC .............. *G06T 5/50* (2013.01); *G01S 17/023* (2013.01); *G01S 17/36* (2013.01); *G01S 17/89* (2013.01); *G06T 5/002* (2013.01); *G06T 2207/10024* (2013.01); *G06T 2207/10028* (2013.01); *G06T 2207/20221* (2013.01)

(58) Field of Classification Search
CPC . G01S 17/89; G01S 17/36; G06T 5/50; G06T 2207/10028
See application file for complete search history.

(56) References Cited

U.S. PATENT DOCUMENTS

| 8,355,565 B1* | 1/2013 | Yang ...................... G06T 7/593 382/154 |
| 2009/0190007 A1 | 7/2009 | Oggier et al. |
| 2013/0027391 A1* | 1/2013 | Lin .................... H04N 13/0007 345/419 |

(Continued)

OTHER PUBLICATIONS

International Search Report and Written Opinion received for corresponding Patent Cooperation Treaty Application No. PCT/FI2013/050476, dated Feb. 14, 2014, 14 pages.

(Continued)

*Primary Examiner* — Behrooz M Senfi
(74) *Attorney, Agent, or Firm* — Alston & Bird LLP

(57) ABSTRACT

It is inter alia disclosed a method comprising: projecting a distance value and position associated with each of a plurality of pixels of an array of pixel sensors in an image sensor of a time of flight camera system onto a three dimensional world coordinate space as a plurality of depth sample points; and merging pixels from a two dimensional camera image with the plurality of depth sample points of the three dimensional world coordinate space to produce a fused two dimensional depth mapped image.

19 Claims, 6 Drawing Sheets

(56) References Cited

U.S. PATENT DOCUMENTS

2013/0100114 A1* 4/2013 Lynch .............. G01C 21/3638
345/419

OTHER PUBLICATIONS

Yang Q. et al. "Spatial-depth super resolution for range images". In proc. of IEEE Conference on Computer Vision and Pattern Recognitioin (CPRV'07) [online] Jun. 18, 2007. Retreived from the internet: http://ieeeexplore.ieee.org/xpls/abs_all.jsp?arnumber=4270236>.

Huhle, B. et al. 'Fusion of range and color images for denoising and resolution enhancement with a non-local filter.' Computer Vision and Image Understanding [online], vol. 114, No. 12, pp. 1336-1345, Dec. 2010. Retrieved from the internet: <URL: http://www.sciencedirect.com/science/article/pii/S1077314210001712>.

'Canesta EP DevKit(DP200).' Datasheet [online] Mar. 24, 2005. Retrieved from the internet <URL: http://ftp.roeder-johnson.com/RJDocs/CADP200DataSheetRev1.pdf>.

Georgiev, M. et al. Joint de-noising and fusion of 2D video and depth map sequences sensed by low-powered ToF range sensor. In proc. of 2013 IEEE International Conference on Multipmedia and Expo Workshops (ICMEW), Jul. 15-19, 2013 Retrieved from the Internet: <URL:http:ieeexplore.ieee.org/xpl/articleDetails.jsp?arnumber=6618264>.

"PMDVision CamCube 3.0", PMD, Retrieved on Dec. 14, 2016, Webpage available at: http://www.pmdtec.com/news_media/video/camcube.php.

"PMDVision CamBoard Nano", PMD, Retrieved on Dec. 15, 2016, Webpage available at: http://www.pmdtec.com_media/news/nano_available.php.

"SwissRangerTM SR4000", Heptagon, Retrieved on Dec. 15, 2016, Webpage available at: http://hptg.com/Industrial/.

"Camera Calibration Toolbox Matlab-Open-Source Application", Vision Caltech, Retrieved on Jan. 23, 2017, Webpage available at: http://www.vision.caltech.edu/bouguetj/calib_doc/.

Chan, "Noise vs. Feature. Probabilistic Denoising of Time-of-Flight Range Data", CS229 Final Project Report, 2008, pp. 5.

Chen et al., "Efficient Depth Image Based Rendering with Edge Dependent Depth Filter and Interpolation", IEEE International Conference on Multimedia and Expo, Jul. 6, 2005, 4 Pages.

Ni et al., "Improving the Quality of Depth Image Based Rendering for 3D Video Systems", 16th IEEE International Conference on Image Processing, Nov. 7-10, 2009, pp. 513-516.

Edeler et al., "Time-of-Flight Depth Image Denoising Using Prior Noise Information", IEEE 10th International Conference on Signal Processing, Oct. 24-28, 2010, pp. 199-122.

Frank et al., "Denoising of Continuous-wave Time-of-flight Depth Images Using Confidence Measures", Optical Engineering, vol. 48, No. 7, Jul. 2009, 24 Pages.

Gao et al., "PMD Camera Calibration Based on Adaptive Bilateral Filter", Symposium on Photonics and Optoelectronics, May 16-18, 2011, 4 Pages.

Herrera et al., "Joint Depth and Color Camera Calibration With Distortion Correction", IEEE Transactions on Pattern Analysis and Machine Intelligence, vol. 34, No. 10, Oct. 2012, pp. 2058-2064.

Kuhnert et al., "Fusion of Stereo-Camera and PMD-Camera Data for Real-Time Suited Precise 3D Environment Reconstruction", IEEE/RSJ International Conference on Intelligent Robots and Systems, Oct. 9-15, 2006, pp. 1780-4785.

Lange, "3D ToF Distance Measurement with Custom Solid-State Image Sensors in CMOS-CCD Technology", Thesis, Jun. 28, 2000, 223 Pages.

May et al., "Three-Dimensional Mapping with Time-of-Flight Cameras", Journal of Field Robotics, vol. 26, No. 11-12, Nov. 2009, pp. 934-965.

Möller et al., "Robust 3D Measurement with PMD Sensors", Proceedings of the 1st Range Imaging Research Day at ETH, 2005, 14 Pages.

Bogdan, "3D is here: Point Cloud Library", PCL, 2012 pp. 4.

Pezoa et al., "Spectral Model for Fixed-Pattern-Noise in Infrared Focal-Plane Arrays", CIARP'11 Proceedings of the 16th Iberoamerican Congress conference on Progress in Pattern Recognition, Image Analysis, Computer Vision, and Applications, Nov. 15-18, 2011, pp. 55-61.

"PMD Technololgies GmbH", PMD technologies, Retrieved on Aug. 23, 2016, Webpage available at: http://pmdtec.com/.

"Patent Portfolio List for PMD ranging device technology", PMD Technologies, Retrieved on Aug. 30, 2016, Webpage available at: http://www.pmdtec.com/technology/patents/.

Schairer et al. "Parallel Non-local Denoising of Depth Maps", In International Workshop on Local and Non-Local Approximation in Image Processing, 2008, 7 Pages.

Extended European Search Report received for corresponding European Patent Application No. 13883494.0, dated Dec. 15, 2016, 9 pages.

Hanning et al., "Calibration and Low-level Data Fusion Algorithms for a Parallel 2D/3D-camera", Information Fusion, vol. 12, No. 1, Jan. 2011, pp. 37-47.

Lucas, R., *Computational Photography—Methods and Applications*, Book Review, Journal of Electronic Imaging, vol. 20(4), (Oct.-Dec. 2011), 5 pages.

Mesa Imaging AG—SwissRanger SR4000—miniature 3D time-of-flight range camera [online] [retrieved Oct. 3, 2018]. Retrieved from the Internet: <https://web.archive.org/web/20120102025203/http://www.mesa-imaging.ch/>. (dated Jan. 2, 2012) 1 page.

* cited by examiner

METHOD AND APPARATUS FOR FUSING DISTANCE DATA FROM A DISTANCE SENSING CAMERA WITH AN IMAGE

RELATED APPLICATION

This application was originally filed as PCT Application No. PCT/FI2013/050476 filed Apr. 29, 2013.

FIELD OF THE APPLICATION

The present application relates to time-of-flight camera systems, and in particular the fusing of the distance data from the time of flight camera system with a two dimensional colour image.

BACKGROUND OF THE APPLICATION

Time-of-flight (ToF) cameras can sense distance or range to an object by emitting a pulse of modulated light signal and then measuring the time differential in the returning wave front.

A ToF camera can comprise a light source such as a bank of light emitting diodes (LED) whereby a continuously modulated harmonic light signal can be emitted. The distance or range of an object from the light source can be determined by measuring the shift in phase (or difference in time) between the emitted and the reflected photons of light. The reflected photons can be sensed by the camera by the means of charge coupled device or the like.

ToF camera can be combined with one or more 2D cameras to produce a fused image in which a colour image from the 2D camera is combined with the distance or 3D data obtained from the ToF camera.

Typically the ToF camera operates at a lower resolution than that of the 2D camera to which it is combined. Consequently, the fusion of distance 3D data with the colour image requires that data from each of the two cameras are to be aligned. This invariably involves the resampling and projection of the distance three dimensional (3D) data on to a higher resolution grid in order to facilitate fusion with the corresponding colour two dimensional (2D) image.

In particular the repositioning of distance 3D data in order to enable fusion with the colour 2D image can typically take the form of projecting the distance 3D data into a real world coordinate space and then further projecting the data onto a higher resolution grid by resampling.

However, as a consequence of the above projecting and resampling processes any measurement noise in the distance 3D data can significantly deteriorate the quality of the eventual fused image.

fusion of a colour image with the 3D distance data may be particularly sensitive to measurement noise in the distance 3D data resulting in significant deterioration in the quality of the eventual 3D image.

Furthermore, the deterioration in the fused image may be particularly exacerbated (profound) when using low power ToF camera sensing devices, as these devices typically produce distance measurement data which inherently comprises more noise than distance measurement data from a ToF sensor operating in so called normal mode of operation.

SUMMARY OF SOME EMBODIMENTS

There is provided according to a first aspect a method comprising: projecting a distance value and position associated with each of a plurality of pixels of an array of pixel sensors in an image sensor of a time of flight camera system onto a three dimensional world coordinate space as a plurality of depth sample points; and merging pixels from a two dimensional camera image with the plurality of depth sample points of the three dimensional world coordinate space to produce a fused two dimensional depth mapped image.

The merging pixels from a two dimensional camera image with the plurality of depth sample points of the three dimensional world coordinate space to produce a fused two dimensional depth mapped image may comprise: dividing the three dimensional world coordinate space into a plurality of Voronoi cells, wherein a seed of each one of the Voronoi cells is one of the depth sample points of the plurality of depth points in the three dimensional world coordinate space; determining a nearest Voronoi cell to the position of at least one pixel of the two dimensional camera image; and allocating a depth value associated with (the depth sample point) the seed of the nearest Voronoi cell to the position of the least one pixel of the two dimensional camera image.

Allocating the depth value associated with the seed of the nearest Voronoi cell to the position of the at least one pixel of the two dimensional camera image may further comprise filtering the depth value allocated to the position of the at least one pixel of the two dimensional camera image to produce a further depth value for the position of the at least one pixel of the two dimensional camera image.

The method may further comprise: interpolating the further depth value to the position the seed of the nearest Voronoi cell; and determining the difference between the interpolated further depth value and the depth value associated with the seed of the nearest Voronoi cell.

The method may further comprise allocating the further depth value to the position of the at least one pixel of the two dimensional camera image dependent on the value of the difference between the interpolated further depth value and the depth value associated with the seed of the nearest Voronoi cell.

Filtering the depth value may comprise filtering the depth value with a cross bilateral filter.

The method may further comprise de-noising at least one depth sample point of the plurality of depth sample points.

De-noising the at least one depth sample point of the plurality of depth sample points may comprise: adjusting the magnitude of the at least one depth sample point along a unit normal vector, wherein the unit normal vector has a projected direction from a centre point of the time of flight camera system through the at least one depth sample point, and wherein the magnitude of the at least one depth sample point along a unit normal vector is determined at least in part by a bilateral filter encompassing further depth sampling points surrounding the at least one depth sampling points.

The plurality of depth sample points projected into a three dimensional world coordinate space may form a point cloud.

The image sensor of the time of flight camera system may be based at least in part on a continuous waveform modulation time of flight camera system.

The continuous waveform modulation time of flight camera system may be a photonic mixer device.

According to a further aspect there is an apparatus configured to: project a distance value and position associated with each of a plurality of pixels of an array of pixel sensors in an image sensor of a time of flight camera system onto a three dimensional world coordinate space as a plurality of depth sample points; and merge pixels from a two dimensional camera image with the plurality of depth sample points of the three dimensional world coordinate space to produce a fused two dimensional depth mapped image.

The apparatus configured to merge pixels from a two dimensional camera image with the plurality of depth sample points of the three dimensional world coordinate space to produce a fused two dimensional depth mapped image is may be further configured to: divide the three dimensional world coordinate space into a plurality of Voronoi cells, wherein a seed of each one of the Voronoi cells is one of the depth sample points of the plurality of depth points in the three dimensional world coordinate space; determine a nearest Voronoi cell to the position of at least one pixel of the two dimensional camera image; and allocate a depth value associated with the seed of the nearest Voronoi cell to the position of the least one pixel of the two dimensional camera image.

The apparatus configured to allocate the depth value associated with the seed of the nearest Voronoi cell to the position of the at least one pixel of the two dimensional camera image may be further configured to filter the depth value allocated to the position of the at least one pixel of the two dimensional camera image to produce a further depth value for the position of the at least one pixel of the two dimensional camera image.

The apparatus may be further configured to: interpolate the further depth value to the position the seed of the nearest Voronoi cell; and determine the difference between the interpolated further depth value and the depth value associated with the seed of the nearest Voronoi cell.

The apparatus may be further configured to allocate the further depth value to the position of the at least one pixel of the two dimensional camera image dependent on the value of the difference between the interpolated further depth value and the depth value associated with the seed of the nearest Voronoi cell.

The apparatus configured to filter the depth value may be further configured to filter the depth value with a cross bilateral filter.

The apparatus may be further configured to de-noise at least one depth sample point of the plurality of depth sample points.

The apparatus configured to de-noise the at least one depth sample point of the plurality of depth sample points may be further configured to adjust the magnitude of the at least one depth sample point along a unit normal vector, wherein the unit normal vector has a projected direction from a centre point of the time of flight camera system through the at least one depth sample point, and wherein the magnitude of the at least one depth sample point along a unit normal vector is determined at least in part by a bilateral filter encompassing further depth sampling points surrounding the at least one depth sampling points.

The plurality of depth sample points may be projected into a three dimensional world coordinate space form a point cloud.

The image sensor of the time of flight camera system may be based at least in part on a continuous waveform modulation time of flight camera system.

The continuous waveform modulation time of flight camera system may be a photonic mixer device.

According to another aspect there is an apparatus comprising at least one processor and at least one memory including computer program code for one or more programs, the at least one memory and the computer program code configured to, with the at least one processor, cause the apparatus at least to: project a distance value and position associated with each of a plurality of pixels of an array of pixel sensors in an image sensor of a time of flight camera system onto a three dimensional world coordinate space as a plurality of depth sample points; and merge pixels from a two dimensional camera image with the plurality of depth sample points of the three dimensional world coordinate space to produce a fused two dimensional depth mapped image.

When the at least one memory and the computer program code causes the apparatus to merge pixels from a two dimensional camera image with the plurality of depth sample points of the three dimensional world coordinate space to produce a fused two dimensional depth mapped image, the at least one memory and the computer program code may further cause the apparatus to: divide the three dimensional world coordinate space into a plurality of Voronoi cells, wherein a seed of each one of the Voronoi cells is one of the depth sample points of the plurality of depth points in the three dimensional world coordinate space; determine a nearest Voronoi cell to the position of at least one pixel of the two dimensional camera image; and allocate a depth value associated with the seed of the nearest Voronoi cell to the position of the least one pixel of the two dimensional camera image.

When the at least one memory and the computer program code causes the apparatus to allocate the depth value associated with the seed of the nearest Voronoi cell to the position of the at least one pixel of the two dimensional camera image, the at least one memory and the computer program code may further cause the apparatus to filter the depth value allocated to the position of the at least one pixel of the two dimensional camera image to produce a further depth value for the position of the at least one pixel of the two dimensional camera image.

The at least one memory and the computer program code may be further configured, with the at least one processor, to cause the apparatus at least to: interpolate the further depth value to the position the seed of the nearest Voronoi cell; and determine the difference between the interpolated further depth value and the depth value associated with the seed of the nearest Voronoi cell.

The at least one memory and the computer program code may be further configured, with the at least one processor, to cause the apparatus at least to allocate the further depth value to the position of the at least one pixel of the two dimensional camera image dependent on the value of the difference between the interpolated further depth value and the depth value associated with the seed of the nearest Voronoi cell.

When the at least one memory and the computer program code causes the apparatus to filter the depth value, the at least one memory and the computer program code may further cause the apparatus to filter the depth value with a cross bilateral filter.

The at least one memory and the computer program code may be further configured, with the at least one processor, to cause the apparatus to de-noise at least one depth sample point of the plurality of depth sample points.

When the at least one memory and the computer program code causes the apparatus to de-noise the at least one depth sample point of the plurality of depth sample points, the at least one memory and the computer program code may further cause the apparatus to adjust the magnitude of the at least one depth sample point along a unit normal vector, wherein the unit normal vector has a projected direction from a centre point of the time of flight camera system through the at least one depth sample point, and wherein the magnitude of the at least one depth sample point along a unit normal vector is determined at least in part by a bilateral filter encompassing further depth sampling points surrounding the at least one depth sampling points.

The plurality of depth sample points projected into a three dimensional world coordinate space may form a point cloud.

The image sensor of the time of flight camera system may be based at least in part on a continuous waveform modulation time of flight camera system.

The continuous waveform modulation time of flight camera system may be a photonic mixer device.

A computer program code may be configured to realize the actions of the method herein when executed by a processor.

An electronic device may comprise apparatus as described herein.

A chipset may comprise apparatus as described herein.

BRIEF DESCRIPTION OF DRAWINGS

For better understanding of the present invention, reference will now be made by way of example to the accompanying drawings in which.

DESCRIPTION OF SOME EMBODIMENTS

Figure 1:
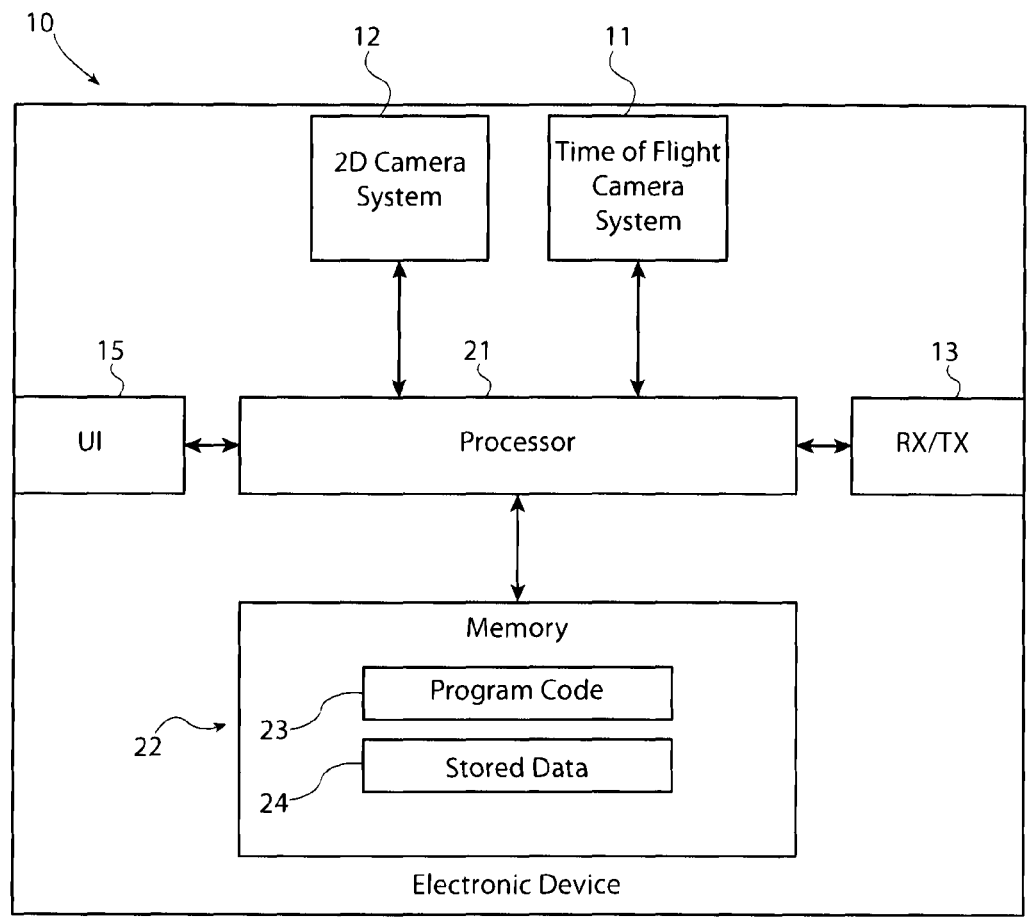
FIG. 1 shows schematically an apparatus suitable for employing some embodiments.

The following describes in more detail possible ToF and 2D camera systems with the provision for combining a colour 2D image with the 3D distance data to produce a 3D image. In this regard reference is first made to FIG. 1 which shows a schematic block diagram of an exemplary electronic device or apparatus 10, which may incorporate a ToF and 2D camera systems according to embodiments of the application.

The apparatus 10 may for example be a mobile terminal or user equipment of a wireless communication system. In other embodiments the apparatus 10 may be an audio-video device such as video camera, audio recorder or audio player such as a mp3 recorder/player, a media recorder (also known as a mp4 recorder/player), or any computer suitable for the processing of audio signals.

In other embodiments the apparatus 10 may for example be a sub component of a larger computer system, whereby the apparatus 10 is arranged to operate with other electronic components or computer systems. In such embodiments the apparatus 10 may be arranged as an application specific integrated circuit (ASIC) with the functionality to control and interface to a ToF camera module and 2D camera module, and also process information from the ToF camera module and 2D camera module.

In some embodiments the apparatus 10 may be arranged as an individual module which can be configured to be integrated into a generic computer such as a personal computer or a laptop.

The apparatus 10 in some embodiments may comprise a ToF camera module 11 and a 2D camera module 12. Each camera module in turn can be coupled to a processor 21. The processor 21 can be configured to execute various program codes. The implemented program codes in some embodiments can comprise code for processing both the depth map image from the ToF camera module 11 and colour image from the 2D camera. In particular the implemented program codes can facilitate noise reduction in the processed distance 3D data, and also fuse the distance 3D data with the 2D colour image in order to form the 3D picture.

In other embodiments the ToF camera and 2D camera may be integrated as one module within the apparatus 10.

In yet other embodiments the ToF camera and 2D camera may each be separate modules arranged to operate externally to an apparatus such apparatus 10. In these embodiments the ToF and 2D camera modules may interface to an apparatus 10 by a connecting means which may facilitate the transmission of data from the camera modules and the processor 21 within the apparatus 10.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data for which has been retrieved from the ToF camera module 11 and the 2D colour camera module 12 for subsequent processing of the 3D distance data and 2D colour image data. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

The display which is part of the user interface 15 may be used for displaying the depth map image as such and can be a liquid crystal display (LCD), or a light emitting diode (LED) display, or an organic LED (OLED) display, or a plasma screen. Furthermore, the user interface 15 may also comprise a pointing device, such as a mouse a trackball, cursor direction keys, or a motion sensor, for controlling a position of a small cursor image presented on the display and for issuing commands associated with graphical elements presented on the display.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further devices by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

It is to be understood again that the structure of the apparatus 10 could be supplemented and varied in many ways.

Figure 2:
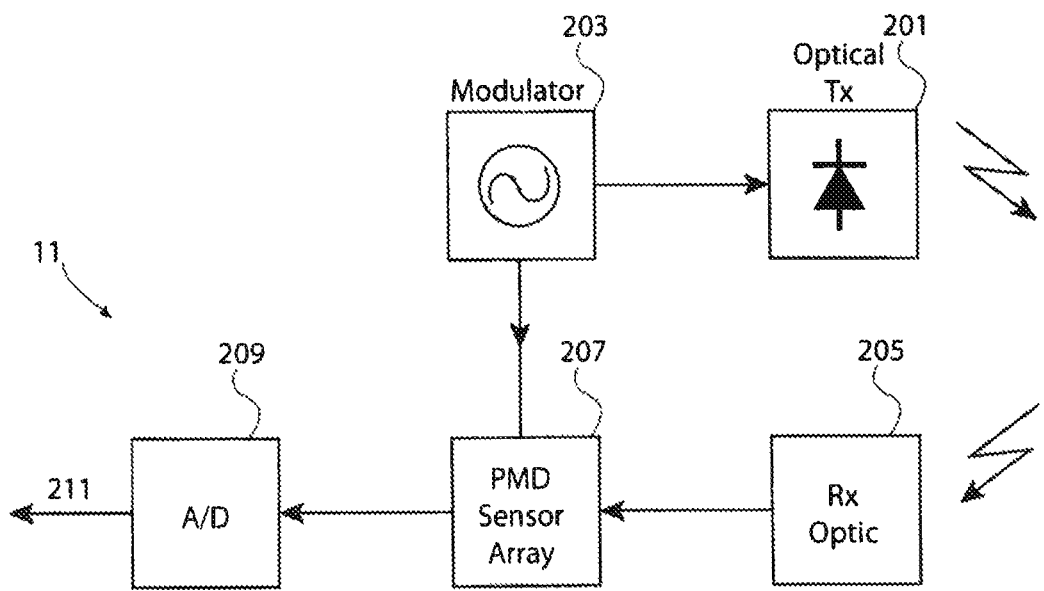
FIG. 2 shows schematically a ToF camera system suitable for employing some embodiments.
Figure 3:
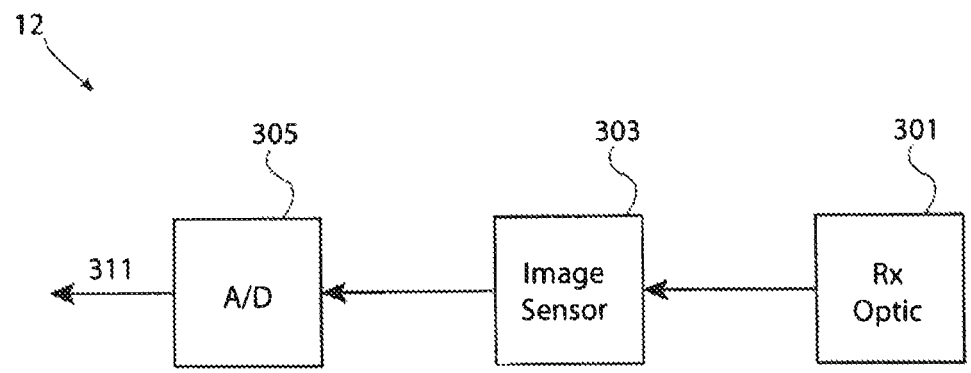
FIG. 3 shows schematically a digital camera system suitable for employing some embodiments.
Figure 4:
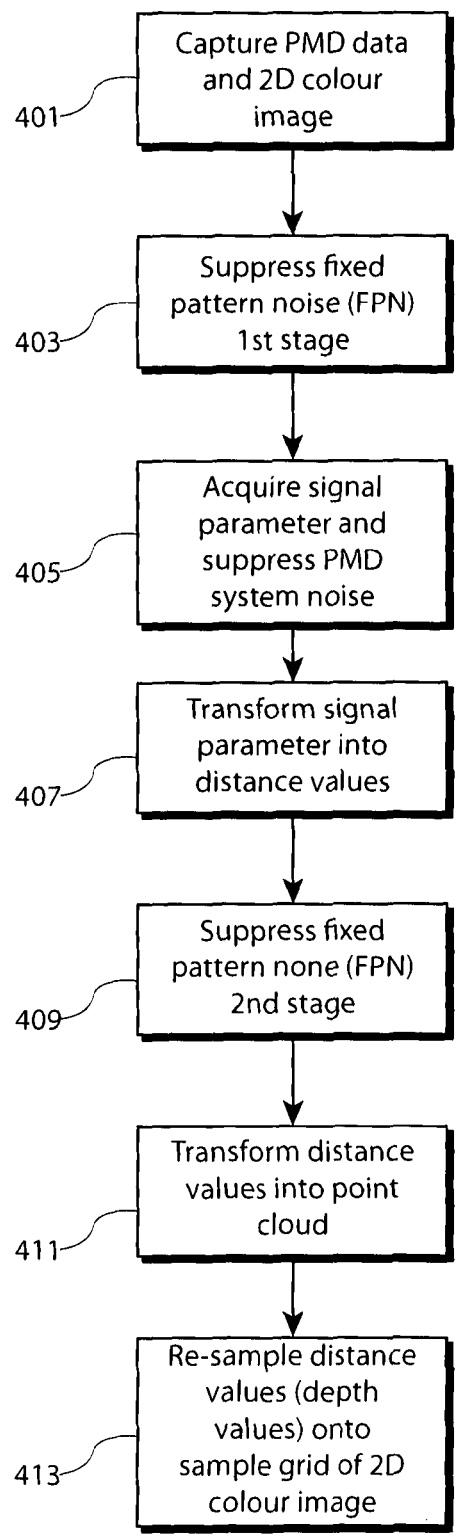
FIG. 4 shows a flow diagram illustrating the operation of fusing distance data from the ToF camera system with an image from the digital camera system.
Figure 5:
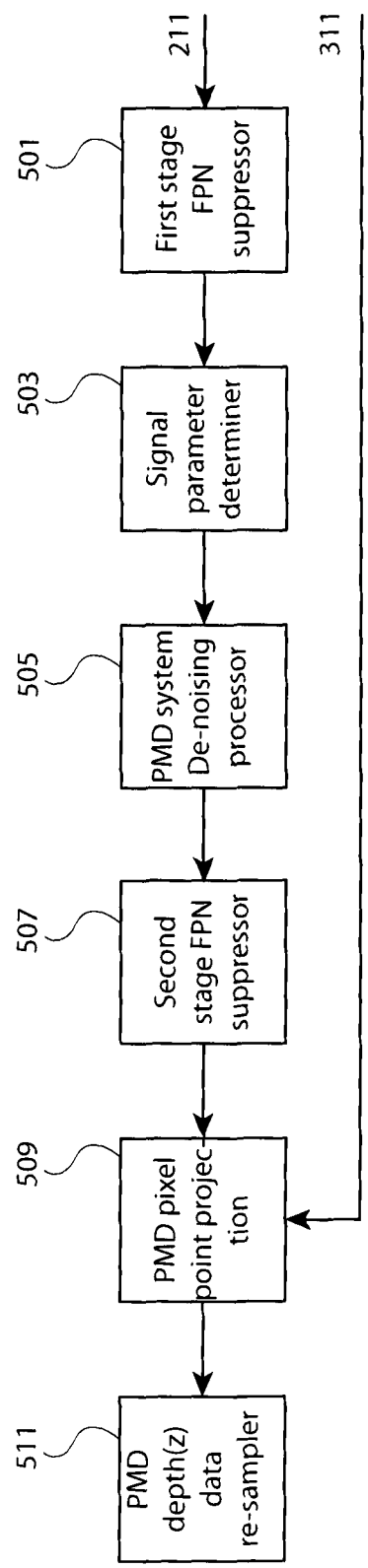
FIG. 5 shows schematically a system for fusing distance data from the ToF camera system with the image from the digital camera system.
Figure 7:
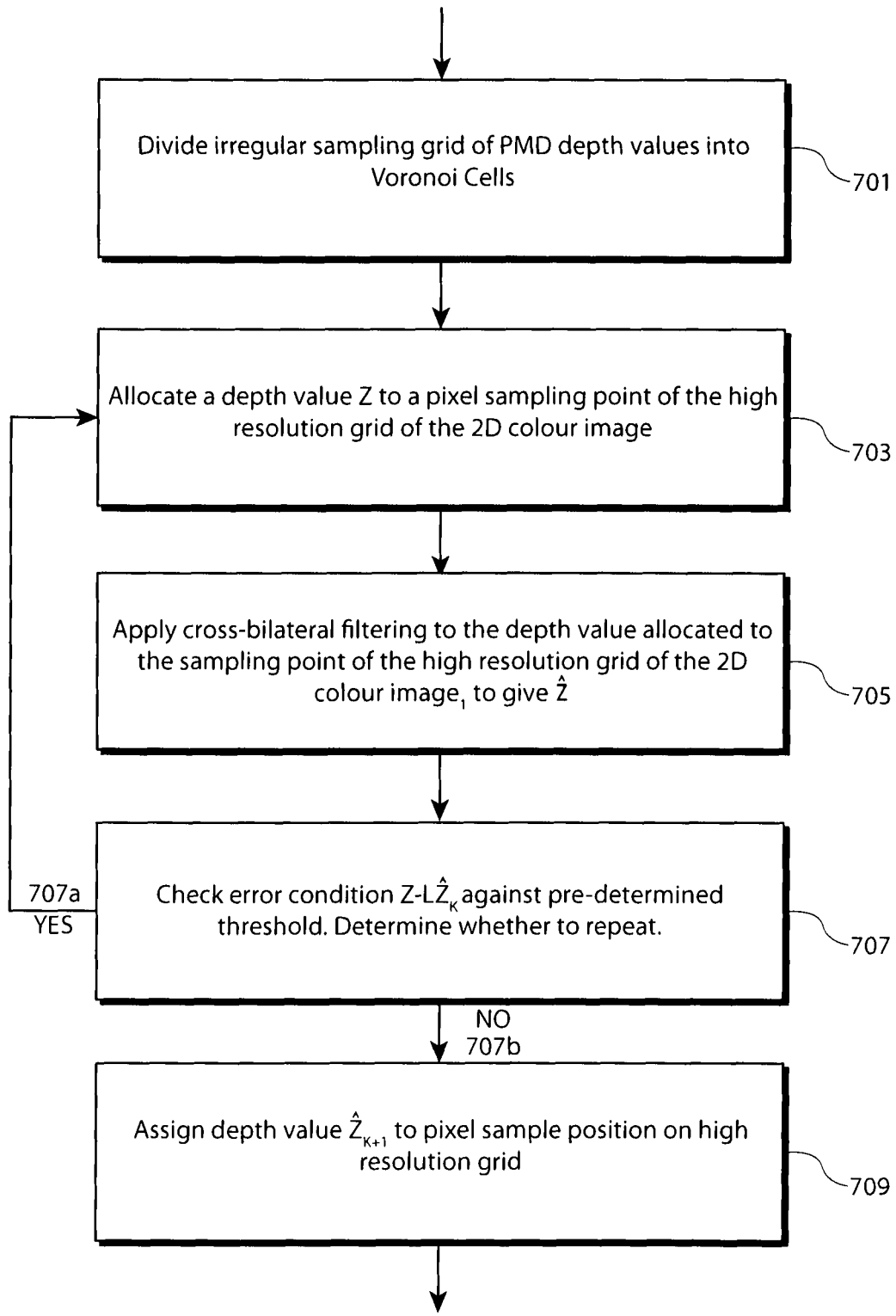
FIG. 7 shows a flow diagram illustrating the operation of at least part of the system of FIG. 5.

It would be appreciated that the schematic structures described in FIGS. 2, 3 and 5 and the flow diagrams depicted in FIGS. 4 and 7 represent only a part of the operation of the ToF and 2D camera systems as exemplarily shown implemented in the apparatus shown in FIG. 1.

FIG. 2 shows schematically some components of the ToF camera module 11 according to some embodiments.

FIG. 4 shows a flow diagram depicting at least part of the processing chain to fuse distance 3D data from the ToF camera system 11 with a colour image from the 2D camera system 12.

It is to be appreciated from herein that embodiments will be described by the means of the Photonic Mixer Device (PMD), a particular example of ToF camera system.

It is to be further appreciated that embodiments may equally deploy other examples of ToF camera systems which use the techniques of continuous waveform modulation in order to determine the time of flight.

In some embodiments the ToF camera module 11 may be a Photonic Mixer Device (PMD) camera module. In such embodiments there may be an optical transmitter 201 which may be arranged to emit a cone of modulated light thereby illuminating a scene for distance detection. In embodiments the optical transmitter may be formed from an array of light emitting diodes (LEDs) configured to operate at wavelengths in the near infra-red (NIR) spectral region. Each LED may be married up with a respective optic in order to assist in the emission of light from the LED.

The light emitted from the optical transmitter may be amplitude modulated by an electrical reference signal from the modulator 203.

The reflected light signal may be received by a receiving optic 205 and channelled to the PMD sensor array 207. The PMD sensor array 207 may comprise an array of pixel sensor elements whereby each pixel sensor element may be in the form of a two light sensitive photo gates which are conductive and transparent to the received light. Each pixel sensor may further comprise readout diodes in order to enable an electrical signal to be read via a pixel readout circuitry.

For example in some embodiments the PMD sensor array 207 may be based on charge coupled device (CCD) or complementary metal oxide semiconductor (CMOS) technologies.

A function of the PMD sensor array 207 can be to correlate the received optical signal for each pixel sensor with the electrical reference signal and to send the results of the correlation (via the readout circuitry of each pixel sensor) to an analogue to digital converter 209. In order to enable the correlation within each pixel sensor, the PMD sensor array 207 may also be arranged to receive the electrical reference signal from the oscillator 205. In embodiments the electrical reference signal used to perform the cross correlation functionality within the PMD sensor may be a phase variant of the original reference signal used to modulate the LED array at the optical transmitter 201.

It is to be appreciated that ToF systems utilise the principle of time of signal propagation in order to determine the range to an object. For PMD type ToF systems this principle may be realised by using continuous wave modulation whereby the phase delay between sent and received light signals corresponds to the ToF and hence the distance to the object.

It is to be further appreciated that other examples of ToF camera modules 11 may also use continuous wave modulation to determine the distance to the object. As stated above, embodiments may equally deploy these other examples of ToF camera modules in order to determine the distance to the object.

When the transmitted light signal is continuously amplitude modulated with a particular frequency the received reflected light signal will have the same frequency but may have a different phase and amplitude. The difference in phase, or phase delay, between the transmitted light signal and received light signal can be used to determine the distance to the object. This distance may be expressed by the following expression $$D \propto \frac{\varphi}{4\pi f} c_s \quad (1)$$

where D is the distance to the object, $\varphi$ is the determined phase delay between received and transmitted light signals, $c_s$ is the speed light and f is the modulation frequency. In embodiments the modulation frequency f may be of the order of 20 MHz.

The phase and the amplitude of the reflected received signal may be determined by cross correlating the reflected received signal with the original modulating signal (electrical reference signal) from the modulator 203. As mentioned above the cross correlation may be performed for each pixel sensor within the PMD sensor array 207.

In embodiments the cross correlation function may be performed at a number of pre-selected phase positions in order to enable the calculation of the phase difference (or delay) between the transmitted light signal and the received reflected light signal.

In a first group of embodiments the cross correlation function $C(\tau)$ between the received reflected light signal s(t) and the modulating signal g(t), may be calculated for four different phase delays, for example at $\tau_0=0°$, $\tau_1=90°$, $\tau_2=180°$, $\tau_3=270°$.

It is to be understood that other embodiments may adopt a general approach to determining the cross correlation function $C(\tau)$. The general approach may calculate the cross correlation function $C(\tau)$ for a number of different phase positions which is greater than four.

The cross correlation function $C(\tau)$ between the received reflected light signal s(t) and the modulating signal g(t) can be expressed as $$C(\tau) = s(t) \otimes g(t) \quad (2)$$

In some embodiments the received reflected light signal s(t) can be expressed in the form of $$s(t) = 1 + A \cdot \cos(\omega t - \varphi), \quad (3)$$

and the modulating signal can be expressed in the form of $$g(t)=\cos(\omega t). \quad (4)$$

Where A denotes the modulation amplitude and $\varphi$ denotes the phase of the received reflected signal.

In some embodiments the cross correlated signal for four different phase delays of $\tau_0=0°$, $\tau_1=90°$, $\tau_2=180°$, $\tau_3=270°$ can be simplified to $$C(\tau)=K+A\cos(\varphi+\tau) \quad (5)$$

Where K is a modulation offset.

It is to be understood that the cross correlation function $C(\tau)$ can be determined at a number of different equally spaced phase positions $\tau$ by the PMD, that is $\tau=\tau_0, \tau_1, \ldots \tau_{N-1}$. In one group of embodiments the cross correlation function $C(\tau)$ can be calculated for the following phase positions $\tau_0=0°$, $\tau_1=90°$, $\tau_2=180°$, $\tau_3=270°$.

The output from the PMD device, in other words the cross correlation function $C(\tau)$ for each pixel sensor, may then be may be channelled to the Analogue to digital converter 209.

The Analogue to Digital (ND) converter 209 may convert each cross correlation function signal from an analogue signal to a digital signal in order to enable further processing of the signal. It is to be appreciated that the A/D converter 209 may convert the cross correlation function signal for each phase position $\tau$ on a pixel wise basis.

The digital output from the A/D converter 209 may then be passed along the connection 211 for further processing.

With reference to FIG. 4, the step of capturing the cross correlation function for each pixel sensor from the ToF system 11, and the step of capturing the 2D colour image with the digital camera system 12 may be shown as the processing step 401.

FIG. 3 shows schematically some components of a digital camera 12 according to some embodiments.

The light may be captured by the digital camera 12 via the receiving optic receiving optic 301. In embodiments the receiving optic may take the form of a camera lens.

The received light from the camera lens 301 may be channelled to an image sensor 303. As above the image sensor 303 may also comprise an array of pixel sensor elements and may be based on CCD or CMOS technologies.

The output from the array of pixel sensors may be passed to an A/D converter 305, where the image signal as captured by the pixel sensors may be digitised.

The digitised image output from the A/D converter 305 may then be passed along connection 311 for further processing.

FIG. 5 shows schematically a system suitable for fusing the distance data from a ToF camera module 11 with the image from the digital camera module 12.

It is to be appreciated in some embodiments that the processing functions depicted in FIG. 5 may be performed within a processor 21.

It is to be further appreciated in other embodiments that some of the processing functions depicted in FIG. 4 may be performed as part of the processing in the ToF camera module 11, or part of the processing in the 2D camera module 12.

FIG. 5 depicts a first stage fixed pattern noise (FPN) suppressor 501 which may be configured to receive as input the digitised cross correlation functions $C(\tau)$ corresponding to each pixel sensor from the output of the A/D converter 209 along the connection 211.

For example, in the group of embodiments, in which the cross correlation function $C(\tau)$ is determined at four equally spaced phase positions, each pixel sensor may comprise four separate cross correlation values, each one corresponding to a different phase position.

The cross correlation values may be viewed as separate images, where an image comprises the cross correlation function value of the same one phase position for each pixel within the image. The images comprising the cross correlation values for all pixel positions within the image may be referred to in embodiments as the raw data images.

For example, in the group of embodiments deploying four equally spaced phase positions in the determination of the cross correlation function for each pixel, then there may be four raw data images, each one corresponding to a different phase position.

In embodiments the PMD sensor may be susceptible to fixed pattern noise (FPN) which may be viewed as a spatially related offset mask. Fixed pattern noise may cause distortions in the resulting depth image map from a ToF sensor. In embodiments these distortions may appear has a series of bright and dark stripes in the depth image map, which may consequently result in distortions in the eventual fused colour image.

It is to be appreciated that distortions as a result of FPN may be caused by structural non-uniformities within the inputs and outputs of the individual sensing elements of the PMD sensor.

It is to be further appreciated in embodiments that the physical effect of FPN may be exacerbated when the PMD sensor is operating in a so called low power mode.

It is to be understood in embodiments that a low power mode of operation may refer to the physical characteristics of the PMD. For example a low power PMD may comprise an optical transmitter formed from an array of LEDs comprising a smaller number of LEDs that typically found in a PMD device capable of operating in a so called normal mode of operation. Further, a low power PMD may comprise an array of LEDs whose power of emitted light may be less than what is found in a PMD device capable of operating in a normal mode. Other restrictions of a PMD device operating as a low power mode may also include smaller integration intervals for each pixel sensor element within the array of pixel sensor elements.

FPN may be characterized by an offset and an amplified gain component.

$$FPN(x,y)=a(x,y)\cdot z(x,y)+b(x,y) \quad (6), \text{where}$$

FPN(x,y) denotes the fixed pattern noise at the pixel position coordinates of x,y in a raw data image, a(x,y) denotes the gain components of the FPN at the pixel position x,y, and b(x,y) denotes the offset in the distance map for the pixel position x,y.

The offset can appear spatially fixed in the sensing array and may often physically take the form of an initial charge within each pixel sensing element within the sensing array. The amplified gain component remains fixed as it amplifies the same captured intensity.

In embodiments the effects of fixed pattern noise may be suppressed by adopting the approach of characterising the properties of the noise of each sensor and then removing its effect from each pixel position in the image.

In order to facilitate the suppression of the fixed pattern noise, a two stage approach may be adopted.

In the first stage of the FPN removal process the noise offset component b may be suppressed by first obtaining for each phase position the value of the cross correlations when the PMD camera is operating in a none sensing mode. In other words the value of the cross correlation functions as determined from the PMD sensor 207 for each phase position when the PMD beaming units have been switched off. This provides a background cross correlation value at each phase position for each pixel sensor of the array of pixels in the PMD unit 11.

The background cross correlation values may then be subtracted from the corresponding raw data cross correlation functions for each phase position on a pixel by pixel basis.

For example, in the group of embodiments in which the cross correlation function for the following phase positions $\tau_0=0°$, $\tau_1=90°$, $\tau_2=180°$, $\tau_3=270°$. The FPN offset component may be removed for each pixel position x, y by $C(\tau)-C_B(\tau)$ for the phase positions $\tau_0, \tau_1, \tau_2, \tau_3$, where $C_B(\tau)$ denotes the background cross correlation values.

The second stage of the FPN suppression process may involve the suppression of the amplified gain component a from the above expression for FPN as given by equation 6.

In embodiments the second stage of FPN suppression may comprise a solution of filtering the distance data value D for each pixel of the pixel array sensor of the PMD.

It is therefore to be appreciated that the second stage of FPN suppression requires that the distance data D is first calculated for each pixel. Accordingly, the second stage of FPN suppression may be performed after determination of the distance values for each pixel sensor within the array of pixel sensors.

The step of performing the first stage of FPN suppression on the cross correlation values associated with each pixel sensor of the array of pixel sensors is shown as processing step 403 in FIG. 4.

The output from the first stage FPN suppressor 501 may be connected to the input of a signal parameter determiner 503, whereby the cross correlation values to which first stage FPN suppression has been applied may be conveyed. As stated above the cross correlation values with comprise the cross correlations at each phase delay for each pixel position within the array of pixel sensors of the PMD 11.

The signal parameter determiner 503 can determine the parameters required to form the distance (or range) map of the illuminated scene on a pixel by pixel basis.

The parameters determined by the distance parameter determiner 503 may be the phase delay $\varphi$ between the modulated signal g(t) and the reflected received signal s(t), the reflected received signal amplitude A, and the modulation offset K.

In embodiments the phase difference $\varphi$ may be determined by using the following expression $$\varphi = \arg\left(\sum_{n=0}^{N-1} C_n e^{-\frac{2\pi n}{N}}\right) \quad (7)$$

The amplitude A of the received reflected optical signal may be determined from $$A = \frac{2}{N}\left|\sum_{n=0}^{N-1} C_n e^{-\frac{2\pi n}{N}}\right| \quad (8)$$

The modulation offset K may be determined from $$K = \frac{1}{N}\left(\sum_{n=0}^{N-1} C_n\right) \quad (9)$$

It is to be appreciated in the above expressions that N signifies the number of phase positions over which the cross correlation function is determined, and $C_n$ represents the Cross correlation functions for each phase position $\tau_n$. In the first group of embodiments N is determined to be four in order to account for the different phase positions $\tau_0=0°$, $\tau_1=90°$, $\tau_2=180°$, $\tau_3=270°$. The phase difference $\varphi$ in this specific embodiment, may be determined by using the following expression $$\varphi = \operatorname{atan}\left(\frac{C(\tau_3) - C(\tau_1)}{C(\tau_0) - C(\tau_2)}\right) \quad (10)$$

The amplitude A of the received reflected optical signal may be determined from $$A = \frac{\sqrt{(C(\tau_3) - C(\tau_1))^2 + (C(\tau_0) - C(\tau_2))^2}}{2} \quad (11)$$

The modulation offset K may be determined as in equation (9)

It is to be further appreciated that the above parameters can be determined for each pixel in turn.

It is to be understood herein that the term signal parameter map may be used to denote collectively the parameters $\varphi$, A and K for all pixels of the map image.

The output of the signal parameter determiner 503, in other words the signal parameter map, may be connected to the input of the de-noising processor 505.

The de-noising processor 505 may be arranged to provide a filtering framework for de-noising the parameters of the signal parameter map. In other words the de-noising processor 505 may be arranged to suppress or remove PMD system noise.

In one approach the de-noising processor 505 may be arranged to de-noise the parameters of the signal parameter map by utilizing a technique of Non-local Means filtering modified to work in the complex domain.

The essence of such an approach is to centre the signal parameters of the pixel which is to be filtered within a window of neighbouring pixels. It is to be noted that the window of pixels may also be known in the art as a patch, and the patch containing the pixel to be filtered is known as the reference patch. The image is then scanned for other patches which closely resemble the patch containing the pixel to be filtered (in other words the reference patch). De-noising of the pixel may then be performed by determining the average pixel value over all pixel values within the image whose patches are deemed to be similar to the reference patch.

In embodiments the similarity between the reference patch and a further patch within the image may be quantified by utilizing a Euclidean based distance metric.

Non-Local spatial transform filtering may be performed on the signal parameters of each pixel on a pixel wise basis.

In a first group of embodiments a form of Non-Local spatial transform filtering known as Non-Local means filtering may be used to filter the signal parameters associated with each pixel.

Non-Local means filtering may be expressed by $$NL(x) = \frac{1}{N_n(x)} \int_\Omega \exp^{\frac{G_\alpha * |u(x+\cdot)-u(y+\cdot)|^2(0)}{h^2}} u(y)dy \quad (12)$$

where $N_n$ is a filter normaliser, $G_\alpha$ is a Guassian Kernel, $\Omega$ denotes the range over which the image is searched, u denotes the values attached to the pixel at a position, x is the index of the pixel being filtered and is the centre pixel of the reference patch, y is the index of the pixel at the centre of a further patch (a patch which can be similar to the reference patch), h can be a filter parameter tuned in relation with noise variance, $*\bullet(0)$ can denote a centred convolution operator, and $(+\bullet)$ can denote the pixel indices around the centre pixel of a corresponding patch.

In a first group of embodiments the signal parameters $\varphi$ and A may each be individually filtered by using the above Non-Local means filter in order to produce de-noised signal parameters $\varphi_D$ and $A_D$. De-noising the parameters $\varphi$ and A may be performed for each pixel position in turn.

In other words the above Non-Local Means Filter may be applied to each signal parameter $\varphi$ and A in turn, where the variable u in the above equation can represent either the parameter $\varphi$ or A.

It is to be understood that the output from the Non-Local Means Filter $NL(x)$ the de-noised parameters $\varphi_D$ and $A_D$ for a pixel position x. In other words the output from the Non-Local Means Filter $NL(x)$ when the input variable u represents the phase difference signal parameter $\varphi$ at pixel position x is the de-noised phase delay signal parameter $\varphi_D$, and the output from the Non-Local Means Filter $NL(x)$ when the input variable u represents the amplitude signal parameter A is the de-noised amplitude parameter $A_D$.

In some embodiments the step of individually processing the signal parameters $\varphi$ and A with the above Non-Local Means Filter to produce the individual de-noised parameters $\varphi_D$ and $A_D$ may be viewed as an optional pre-filtering step.

In other words the step of individually processing the signal parameters $\varphi$ and A may not be performed in some modes of operation. The decision to perform the above pre filtering step may be configured as a mode of operational of the de-noising processor 505.

In other embodiments pre filtering by the de-noising filter $NL(x)$ may be performed on either just the amplitude signal parameter A or the phase delay signal parameter $\varphi$. This has the effect of reducing the computational complexity of the pre-filtering stage when compared to applying the de-noising filter individually to each signal parameter in turn.

In one variant of the above group of embodiments the de-noising filter $NL(x)$ may be applied solely to the amplitude signal parameter A to give the de-noised amplitude signal parameter $A_D$. This can have the advantage in embodiments of improving the de-noising and edge preservation in the eventual distance map, however the effects due to structural artefacts such as those listed above may still be retained.

In another variant of the above group of embodiments the de-noising filter $NL(x)$ may be applied solely to the phase delay signal parameter $\varphi$. This can have the advantage of suppressing artefacts such as those listed above however edge preservation may not be so pronounced in the eventual distance image.

The phase difference $\varphi$ and amplitude A of the received reflected light signal for each pixel may be combined into a single combined parameter.

In some embodiments the phase difference $\varphi$ and amplitude A of the received reflected light signal for each pixel sensor may be combined into a single complex parameter Z. The complex signal parameter for each pixel may be expressed as $$Z = Ae^{j\varphi}, \quad (13)$$

where j is the imaginary unit. It is to be understood that in a mode of operation whereby the above pre filtering step is deployed the complex signal parameter may be expressed as $$Z = A_D e^{j\varphi_D}. \quad (14)$$

In embodiments the de-noising filter may be applied to the complex signal Z for each pixel within the signal parameter map.

In a first group of embodiments the complex signal parameter Z for each pixel may be de-noised by applying the above Non-Local Means Filter. In other words, the above Non-local Means Filter may be modified in terms of the complex signal parameter Z. The Non-Local Means Filter may be expressed in terms of Z as $$NL_{cmplx}(x) = \frac{1}{N_n(x)} \int_\Omega \exp^{\frac{G_\alpha * |Z(x+\cdot)-Z(y+\cdot)|(0)}{h^2}} Z(y)dy \quad (15)$$

The output from the above Non-Local means filter $NL_{cmplx}(x)$ may be the de-noised complex signal parameter $Z_{DeN}$ at the pixel position x.

In other words embodiments may comprise means for de-noising the combined signal parameter for a pixel light sensor by filtering the combined parameter.

In some embodiments the combined signal parameter may be a complex signal parameter formed from combining the amplitude and phase difference for the pixel light sensor.

The de-noised signal parameters $A_{DeN}$ and $\varphi_{DeN}$ for each pixel position x may be obtained from the de-noised complex signal parameter $Z_{DeN}$. In other words the de-noised amplitude $A_N$ and phase difference $\varphi_N$ can be obtained from $A_{DeN} = |Z_{DeN}|$ and $\varphi_{DeN} = \arg(Z_{DeN})$ respectively.

In some embodiments some of the above processing steps may be repeated for a number of iterations. In such embodiments the de-noised signal parameters $A_{DeN}$ and $\varphi_{DeN}$ for each pixel at position x may form the input to a further iteration of processing step 305, whereby the signal parameters $A_{DeN}$ and $\varphi_{DeN}$ may then be individually applied to the above Non-Local means filter $NL(x)$.

Further de-noised signal parameters, where the signal parameters $A_{DeN}$ and $\varphi_{DeN}$ form the input to the Non-Local means filter $NL(x)$, may be denoted as $A_{D2}$ and $\varphi_{D2}$ where "2" denotes a second or further iteration.

As before the output of the Non-Local means filter $NL(x)$ filter, that is the individually de-noised amplitude and phase difference signal parameters $A_{D2}$ and $\varphi_{D2}$ for each phase position x, may then be combined into a single combined parameter. In a first group of embodiments the single combined parameter may be a single complex parameter $Z_2$.

The single complex parameter $Z_2$ may then form the input of the complex modified form of the Non-Local Means Filter $NL_{cmplx}(x)$.

The output of the complex modified form of the Non-Local Means Filter $NL_{cmplx}(x)$ may then be a further de-noised complex parameter $Z_{DeN2}$ for a pixel position x.

The de-noised amplitude $A_{DeN2}$ and phase difference $\varphi_{DeN2}$ can be obtained by further applying the equations $A_{DeN2} = |Z_{DeN2}|$ and $\varphi_{DeN2} = \arg(Z_{DeN2})$.

In embodiments, parameters of the Non-Local spatial transform filter may be adjusted for each processing loop.

For instance, in the first group of embodiments the filter parameter h in the Non-local means filter can be adapted for each iteration of the processing loop.

The step of determining the signal parameters from the cross correlation values for each pixel and suppressing PMD system noise is shown as processing step 405 in FIG. 4.

The de-nosing processor 505 may then determine the distance value D to the illuminated object for each pixel position.

In embodiments the distance value D may be determined by taking the de-noised phase difference signal parameter $\varphi_{DeN}$ and applying the value to equation (1) above.

The distance value D may be determined on a pixel wise basis in accordance with the phase delay for each pixel position within the map.

The set of transforming the de-noised signal parameters into distance values for each pixel position is shown as processing step 407 in FIG. 4.

The output from the de-noising processor 505 may be the distance image map comprising the distance values associated with the pixel sensors of the PMD.

The output from the De-noising processor 505 may be connected to the input of the second stage FPN suppressor 507, whereby the determined distance values for the pixel sensors of the PMD may be conveyed.

The second stage FPN suppressor 507 may be arranged to suppress the FPN gain component a as expressed in equation 5 above for each pixel position.

In embodiments the step of suppressing the FPN gain components may require a specially prepared scene comprising of smooth surfaces with no discontinuities or edges. Such a scene may have the advantage of revealing the gain component FPN noise properties by 2D Fourier analysis. For instance, in the case of no FPN the specially prepared scene may only have a low frequency response comprising a comb along both the X and Y directions. However, should the PMD pixel map have any horizontal or vertical stripes, which may be an indication of the presence of the gain component of FPN then the 2D Fourier analysis may exhibit this presence as a peak located on the frequency axes.

The peak in the frequency domain may then be used to determine the FPN gain component. In order to remove the FPN gain component a row-wise comb filter such as a Keiser-window may be applied to the distance pixel map.

In embodiments the parameters of the row-wise comb filter maybe optimized such that the frequency peaks are adequately suppressed with a minimal overall distortion to the distance values.

The step of applying second stage FPN suppression to each distance value of the pixels of the PMD is represented as processing step 409 in FIG. 4.

The output from the second stage FPN suppressor 507 may be connected to the PMD pixel point projector 509.

In embodiments the PMD pixel point projector 509 may be arranged to receive the de-noised distance values to the illuminated object for each pixel position of the pixel array of the PMD 11. In other words the PMD pixel point projector can receive the distance value associated with each pixel position of the distance map.

The PMD pixel point projector 509 may project each pixel position of the distance map into a world coordinate space by converting a pixel at position (u,v) on the distance image map with a distance value D(u,v) into a corresponding world coordinate position (x, y, z). Where x denotes the width, y denotes the height and z denotes the depth. This conversion may be performed for all pixels of the distance image map.

In embodiments the resulting projection of each pixel within the distance map image onto a corresponding coordinate position within the world coordinate space may be referred to as a point cloud.

The projection of each pixel position (u, v) of the PMD distance image map with distance value D(u,v) on to a world coordinate position (x, y, z) may be performed by applying the following transform to each pixel position in the distance map image.

$$[z, x, y] = \frac{D(u, v)}{d(u, v)} [f_{PMD}, u, v], \quad (16)$$

where $$d(u, v) = \sqrt{(p_{PMD} - u)^2 + (p_{PMD} - v)^2 + f_{PMD}^2}. \quad (17)$$

$f_{PMD}$ and $f_{2D}$ represent the focal lengths of the PMD and 2D colour cameras respectively. The principal coordinates for each camera, in other words the point at which the image plane intersects the optical axis, can be represented as $p_{PMD}(x,y)$ and $p_{2D}(x',y')$ respectively.

The point cloud formed by projecting each pixel with its corresponding distance value into the coordinate world space can take the appearance of a surface mesh, with each point on the surface mesh can be modelled as an optical ray at with a specific range from the PMD camera centre $C_o$.

It is to be understood that the projected distance value D(u,v) in the world coordinate space (x, y, z) forms the depth value z, which is the value of interest.

The step of transforming the distance value for each pixel in the distance map into a point cloud may be represented as the processing step 411 in FIG. 4.

The point cloud may be de-noised by using a surface mesh de-noising approach, whereby for each vertex of the surface mesh a noise free surface may be defined in terms of a normal unit vector projecting from the centre of the PMD camera and the through the particular vertex over which the noise free surface has been defined.

Noise reduction in the point cloud may be achieved by updating the position of the vertex along the normal unit vector.

If a vertex p in the surface mesh has world coordinates (x, y, z), then a noise free surface $S_H$ may be defined by the normal unit vector $n_p$.

The vertex p may be updated along the normal unit vector $n_p$ by as follows:

$$p' = p + d(p) \cdot n_p \quad (18)$$

d(p) can be determined by a bilateral filter and may be given as $$d(p) = \frac{1}{C(p)} \sum_{r \in R} \exp\left(\frac{\|r - p\|^2}{2h_r^2}\right) \exp\left(\frac{\langle n_P, (r - p) \rangle^2}{h_d^2}\right) \langle n_P, (r - p) \rangle \quad (19)$$

where the inner product and the vector norm in the above expression effectively give the distance of the vertex p and surrounding vertices r to the noise free surface, $C_{(p)}$ is a filter normalizer, $h_r$, $h_d$ are filter parameters, and R is a ring of neighbouring vertices r around the vertex p.

Figure 6:
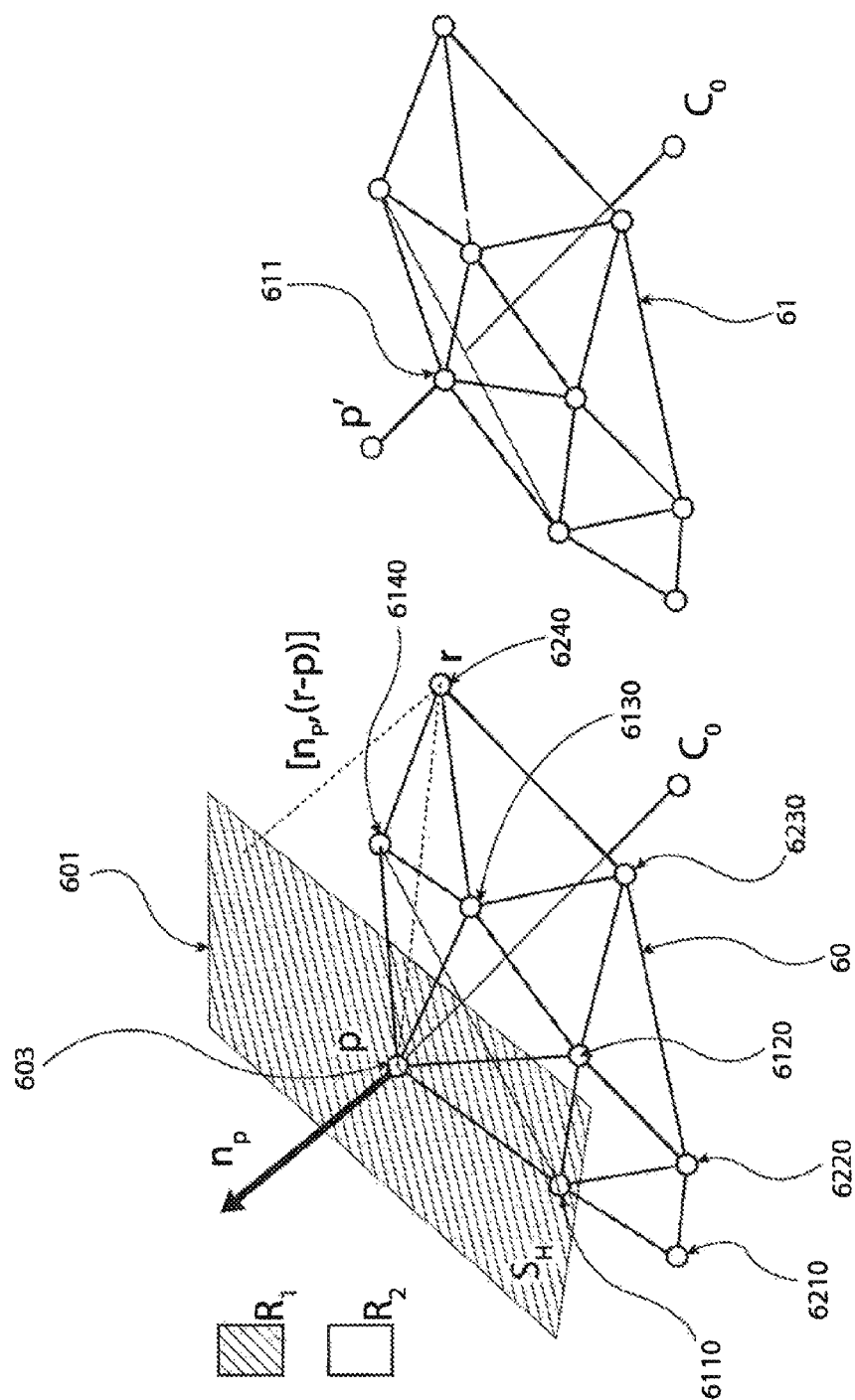
FIG. 6 schematically illustrates an example of applying a bilateral filter to a surface mesh for the purpose of de-noising distance data as deployed by some embodiments.

With reference to FIG. 6 there is shown schematically an illustrative example of applying a bilateral filter to a surface mesh for the purpose of de-noising as deployed by some embodiments.

With further reference to FIG. 6 there is shown an illustrative example surface mesh 60 before the application of the above bilateral filter. Also shown in FIG. 6 is an illustrative example de-noised surface mesh 61, where the de-noising process has been performed around the vertex p 603 by applying equations 18 and 19 above. The de-noised vertex p' may be represented as point 611 in FIG. 6.

The vertices in R may be selected as the closest vertices to p→$R_1$, in other words the vertices which immediately encompass the vertex p. An illustrative example of the set $R_1$ may be shown in FIG. 6 as the vertices 6110, 6120, 6130 and 6140 which immediately encompass the vertex p.

In other embodiments the vertices comprising the set R may be extended to encompass the next further ring of vertices which surround the vertex p. In other words a set of surrounding vertices $R_2$ can include the vertices in set $R_1$ in addition to the vertices within the next further ring or vertices which surround the vertex p. With further reference to FIG. 6, an illustrative example of vertices in a set $R_2$ may comprise the vertices 6110, 6120, 6130 and 6140, and the vertices 6210, 6220, 6230 and 6240.

In embodiments the noise free surface $S_H$ for each vertex may be selected as the surface whose normal-unit vector is collinear to an optical array emanating from the centre of the camera $C_O$ to the vertex p 603. With reference to the illustrative example depicted in FIG. 6, the noise free surface $S_H$ for the vertex p may be seen as the planar surface 601.

In further embodiments the set R may be extended to encompass even further rings of vertices about the vertex p. In general these sets may be denoted as $R_n$ where n denotes an integer.

It is to be understood in embodiments the above bilateral filtering process may be applied to each vertex point in turn within the surface mesh 60.

It is to be further understood in embodiments the output from the PMD pixel point projector 509 may be the de-noised point cloud data. The de-noised point cloud data being the set of PMD distance values which have been projected in to a world coordinate space and then de-noised using the technique of bilateral filtering over a surface mesh representation of the set of projected PMD distance values (or PMD depth values).

The overall step of de-noising the point cloud may be represented as the processing step 411 in FIG. 4.

The output of the PMD pixel point projector 509 may be connected to the input of the PMD depth data re-sampler 511.

Furthermore the PMD depth data re-sampler 511 may be arranged to receive a further input along the connection 213. The connection 311 may be arranged to convey the colour 2D image from the output of the analogue to digital converter 305 to the PMD depth data re-sampler 511.

The PMD depth data re-sampler 511 may be arranged to project the de-noised point cloud data onto the 2D pixel coordinate system of the 2D colour image. The operation of the PMD depth data re-sampler 511 will hereafter be described in more detail in conjunction with the flow diagram of FIG. 7.

It is to be appreciated in embodiments that the coordinate system upon which the pixels of the 2D colour image are distributed may be a regular grid pattern. By contrast the coordinate positions (x,y) of the de-noised depth values in the point cloud may be distributed as an irregular grid pattern. Furthermore the number of de-noised depth values within the point cloud can be fewer than the number of pixels in the 2D colour image. In other words, the resolution of the PMD camera system 11 may be less than the resolution of the 2D camera system 12.

Therefore when compared to the colour image as produced by the 2D camera system the de-noised point cloud may be less densely sampled (in other words fewer depth value sample points) and the sample points may be distributed across an irregular coarser grid pattern.

In order to facilitate the merging of the depth data derived from the PMD camera system 11 with that of the colour image from the 2D camera system 12, the depth value sample points from the irregular coarser sample grid of the point cloud may be projected onto the regular higher sampling rate grid of the colour image.

Therefore the PMD depth data re-sampler 511 may be arranged to find the corresponding depth value at each sample point of the regular higher resolution grid of the 2D colour image.

In a first stage of the resampling process the PMD depth data re-sampler 511 may fit a Voronoi cell around each depth value sample point on the coarse irregular grid by considering the x, y coordinates of each depth value sample point as centre or seed of a Voronoi cell. The Voronoi cell around a particular depth value sample point (or seed) may comprise every point whose depth to the seed is less than or equal to its depth to any other seed. In embodiments the entire sampling domain of the PMD depth data (in other words the coarse irregular sampling grid) can be divided into Voronoi cells.

The step of dividing the coarse irregular sampling grid space of the PMD depth values into Voronoi cells is shown as the processing step 701 in FIG. 7.

In embodiments a sample point of the regular higher resolution grid of the 2D colour image may then be mapped to a depth value sample point on the irregular grid (the seed of a Voronoi cell). The mapping may be achieved by the method of nearest neighbour interpolation whereby it may be determined into which Voronoi cell the position of a sample point of the higher resolution grid lies. In some embodiments this process may be visualized by overlaying the regular higher resampling grid on top of the Voronoi cells of the coarser sampling grid of the point cloud and determining into which Voronoi cell each regular sampling point may lie.

The sampling point on the regular grid of the 2D colour image may then be assigned, as an initial step, the depth value z associated with the seed of the determined Voronoi cell. This procedure may be repeated for all sampling points of the regular higher resolution grid of the 2D colour image.

It is to be appreciated in embodiments that as a consequence of the above initial procedure each Voronoi cell may be assigned more than one pixel sampling point from the higher resolution grid of the 2D colour image.

Therefore it may be viewed that the PMD depth data re-sampler 511 spreads the depth values z from each irregular positions of the point cloud across the regular pixel sampling points within the higher resolution grid of the 2D colour image by the process of Voronoi tessellation.

It is to be appreciated in embodiments that this processing step may result in the depth values z from the point cloud and the colour pixels from the 2D colour image being both being mapped to the regular sampling grid of the 2D colour image.

The processing step of allocating an initial depth value to each pixel sampling point of the regular higher resolution sampling grid of the 2D colour image by the process of Voronoi tessellation can be depicted as the processing step 703 in FIG. 7.

In embodiments the depth values associated with each pixel sample point of the regular higher resolution grid may undergo cross-bilateral filtering in order to obtain a further more refined depth value at the pixel sample point.

In embodiments, the refining or adjustment of the depth values associated with each pixel sample point may be an iterative process.

The cross-bilateral filtering may filter the depth value z at a pixel sampling point with a kernel of weights based on the colour similarity of the surrounding pixel sample points. The filtering may be applied to the depth value z of each pixel sampling point within the regular higher resolution grid.

Cross bilateral filtering has an advantage of smoothing out any blocking artifacts arising from the application of the above nearest neighbour Voronoi interpolation whilst preserving the edges of objects in the combined image.

If $z_{k,int}(n,m)$ represents the depth value obtained by nearest neighbour Voronoi interpolation at the position n,m in the regular higher resolution grid for iteration k, in other words the depth value allocated at step 703 in FIG. 7, then the output of the cross-bilateral filtering process for the depth value at the position n, m in the regular higher resolution grid may be denoted as $\hat{z}_k(n,m)$.

The cross-bilateral filtering process may be expressed in terms $z_{k,int}(n,m)$ and $\hat{z}_k(n,m)$ for the position n,m in the regular higher resolution grid and for iteration k as $$\hat{z}_k(n.m) = r(n,m) \sum_{i,j \in B} e^{((n-i)^2+(m-j)^2)^{\frac{1}{2}}} e^{(|y(n,m)-y(i,j)|)} z_{k,int}(i,j) \quad (19)$$

Where B is a rectangular block centered at the pixel position (n,m) and r(n,m) is given by $$r(n,m) = \left[ \sum_{i,j \in B} e^{((n-i)^2+(m-j)^2)^{\frac{1}{2}}} e^{(|y(n,m)-y(i,j)|)} \right]^{-1} \quad (20)$$

It is to be appreciated in embodiments that cross-bilateral filtering may be applied to the allocated depth value at each pixel sample point in the higher resolution grid.

The step of applying cross-bilateral filtering to the depth value of a pixel sample point in the higher resolution grid is shown as the processing step 705 in FIG. 7.

In some embodiments the processing step 703 may be repeated taking into account the adjusted depth value generated as a result of cross-bilateral filtering.

In these embodiments the depth value $z_k(n,m)$ at the pixel sampling point n,m in the higher resolution grid may be further adjusted by using the difference between the original depth values z associated with the sampling points of the irregular grid (the seeds of the Voronoi cell) and so called interpolated depth values for the sampling point of the irregular grid. The interpolated depth values for the sampling points of the irregular grid may be determined by taking the depth values $\hat{z}_k(n,m)$ at the regular position sampling points n,m after the k-th iteration and interpolating the depth values at the seeds of the Voronoi cell from the depth values $\hat{z}_k(n,m)$ at the regular position sampling points n,m. The interpolated depth values at the seeds of the Voronoi cell may be expressed as $L\hat{z}_k$, where L is a bi-linear interpolator.

Therefore the difference between the original depth values z associated with the sampling point of the irregular grid (the seed of the Voronoi cell) and so called linearly interpolated depth values for the sampling points of the irregular grid may be expressed as $z - L\hat{z}_k$.

In embodiments the nearest neighbourhood Voronoi interpolation may then be applied to each pixel sampling points n,m of the regular high resolution grid based on the above difference expression $z - L\hat{z}_k$. For the whole regular-grid depth image, this may be expressed as $$\lambda V(z - L\hat{z}_k), \quad (21), \text{where}$$

V represents the nearest neighbourhood Voronoi interpolation operator, and λ represents a tunable relaxation parameter.

Accordingly, in embodiments the depth values $\hat{z}_k$ at pixel sample points n,m may be updated according to $$\hat{z}_k + \lambda V(z - L\hat{z}_k) \quad (22)$$

It is to be understood in embodiments that the step may be an iterative step in which steps 703 and 705 may be repeated as part of the iteration process, where k denotes the iteration.

In a first iteration of the loop at step 703 the value of $\hat{z}_k$ may be initialized to zero, thereby signifying that in the first iteration the depth value at each sampling point of the regular grid can be determined to be the depth value of the irregular sampling point (z) fitted by nearest neighbourhood Voronoi interpolation.

It is to be further understood in embodiments that once the depth value $\hat{z}_k$ for each sampling point of the regular grid has been determined, at an iteration k, then the determined value may be filtered as described above in processing step 705 to produce the adjusted or refined depth value. This depth value may then form the depth value $\hat{z}_{k+1}$ for the next iteration of the processing loop.

In embodiments the overall iterative process of processing steps 703 and 705 may be expressed as $$\hat{z}_{k+1} = B(\hat{z}_k + \lambda V(z - L\hat{z}_k)), \quad (23)$$

where B signifies the above cross bi-lateral filtering process of processing step 705 and as represented by equations 19 and 20 above.

It is to be understood in embodiments that processing steps 703 and 705 are repeated conditionally on whether the values of the difference between the original depth values z associated with the sampling point of the irregular grid (the seed of the Voronoi cell) and the linearly interpolated depth value for the sampling point of the irregular grid at the iteration k, $L\hat{z}_k$, is below a predetermined threshold value. In other words the iterative loop comprising processing steps 703 and 705 may only be repeated dependent on whether the value of the following error condition $\|z - L\hat{z}_{k+1}\|_2$, where $\|\bullet\|_2$ denotes square Eucledian norm ($l_2$ norm) is below a predetermined threshold If it is determined that the above error condition is below the predetermined threshold then the processing steps 703 and 705 may not be repeated.

Experimental results have indicated that the above error condition may be small enough after two to three iterations of the processing loop.

The step of determining whether to repeat the iterative loop comprising steps 703 and 705 is shown as decision step 707 in FIG. 6.

With further reference to FIG. 7, the decision step 707 has two outputs. The first output branch 707a may be taken if it is determined that the above error condition is still above the predetermined threshold thereby inferring that the error condition has not been met. In this first decision instance the processing cycle may be passed back to the processing step 703.

The second output branch 707b may be taken if it is determined that the above error condition is below the predetermined threshold. In this second decision instance the processing cycle may proceed to the next processing step 709.

When the above error condition is below the predetermined threshold as indicated by taking branch 707b, the depth value $z_{k+1}$ may be assigned to the pixel sample position (m,n) in the regular high resolution grid of the 2D colour image.

The step of assigning the depth value $\hat{z}_{k+1}$ to the pixel sample position (m, n) in the regular high resolution grid is shown as processing step 709 in FIG. 7.

It is to be understood in embodiments that processing steps 703 to 709 may be repeated for all pixel sample points of the regular high resolution grid.

It is to be further understood in embodiments that processing steps 701 to 709 result in a depth value being assigned to each pixel sample point on the regular high resolution grid of the 2D colour image.

Therefore, in embodiments the processing functionality associated with the PMD depth data re-sampler 511 has the advantage of resampling the distance values from the irregular coarse grid of the point cloud on to the pixel sample points of the regular high resolution sampling grid of the 2D colour image.

In other words the output from the PMD depth data re-sampler 511 may be a 3D representative image whereby the distance data from the fused PMD camera system 11 is fused with the colour 2D image from the 2D camera 12, as fused PMD/2D image.

The overall step of re-sampling the PMD depth data values onto the regular higher resolution sampling grid of the 2D image is shown as processing step 413 in FIG. 4.

In some embodiments the fused PMD/2D image may then be displayed in the UI 15, or processed further by the processor 10.

In is to be noted that other embodiments may adopt other ToF camera systems such as radars, sonars and lidars.

Although the above examples describe embodiments of the invention operating within an apparatus 10, it would be appreciated that the invention as described above may be implemented as part of any computer or electronic apparatus supporting both ToF and a 2D camera systems.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus at least some embodiments may be an apparatus comprising at least one processor and at least one memory including computer program code the at least one memory and the computer program code configured to, with the at least one processor, cause the apparatus at least to perform: determining a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal; determining an amplitude of the reflected light signal received by the at least one pixel sensor; combining the amplitude and phase difference for the at least one pixel sensor into a combined signal parameter for the at least one pixel sensor; and de-noising the combined signal parameter for the at least one pixel sensor by filtering the combined parameter for the at least one pixel sensor.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

Thus at least some embodiments of the encoder may be a non-transitory computer-readable storage medium having stored thereon computer readable, which, when executed by a computing apparatus, causes the computing apparatus to perform a method comprising: determining a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal; determining an amplitude of the reflected light signal received by the at least one pixel sensor; combining the amplitude and phase difference for the at least one pixel sensor into a combined signal parameter for the at least one pixel sensor; and de-noising the combined signal parameter for the at least one pixel sensor by filtering the combined parameter for the at least one pixel sensor.

The memory may be of any type suitable to the local technical environment and may be implemented using any suitable data storage technology, such as semiconductor-based memory devices, magnetic memory devices and systems, optical memory devices and systems, fixed memory and removable memory, in other words a non-transitory computer-readable storage medium. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
projecting a distance value and position associated with each of a plurality of pixels of an array of pixel sensors in an image sensor of a time of flight camera system onto a three dimensional world coordinate space as a plurality of depth sample points;
de-noising at least one depth sample point of the plurality of depth sample points by adjusting a magnitude of the at least one depth sample point along a unit normal vector, wherein the unit normal vector has a projected direction from a center point of the time of flight camera system through the at least one depth sample point, and wherein the magnitude of the at least one depth sample point along a unit normal vector is determined at least in part by a bilateral filter encompassing further depth sampling points surrounding the at least one depth sampling point; and
merging pixels from a two dimensional camera image with the plurality of depth sample points of the three dimensional world coordinate space to produce a fused two dimensional depth mapped image.

2. The method as claimed in claim 1, wherein merging pixels from a two dimensional camera image with the plurality of depth sample points of the three dimensional world coordinate space to produce a fused two dimensional depth mapped image comprises:
dividing the three dimensional world coordinate space into a plurality of Voronoi cells, wherein a seed of each one of the Voronoi cells is one of the depth sample points of the plurality of depth points in the three dimensional world coordinate space;
determining a nearest Voronoi cell to the position of at least one pixel of the two dimensional camera image; and
allocating a depth value associated with the seed of the nearest Voronoi cell to the position of the least one pixel of the two dimensional camera image.

3. The method as claimed in claim 2, wherein allocating the depth value associated with the seed of the nearest Voronoi cell to the position of the at least one pixel of the two dimensional camera image further comprises filtering the depth value allocated to the position of the at least one pixel of the two dimensional camera image to produce a further depth value for the position of the at least one pixel of the two dimensional camera image.

4. The method as claimed in claim 3, further comprising:
interpolating the further depth value to the position the seed of the nearest Voronoi cell; and
determining the difference between the interpolated further depth value and the depth value associated with the seed of the nearest Voronoi cell.

5. The method as claimed in claim 4, further comprising: allocating the further depth value to the position of the at least one pixel of the two dimensional camera image dependent on the value of the difference between the interpolated further depth value and the depth value associated with the seed of the nearest Voronoi cell.

6. The method as claimed in claim 3, wherein filtering the depth value comprises filtering the depth value with a cross bilateral filter.

7. The method as claimed in claim 1, wherein the plurality of depth sample points projected into a three dimensional world coordinate space form a point cloud.

8. The method as claimed in claim 1, wherein the image sensor of the time of flight camera system is based at least in part on a continuous waveform modulation time of flight camera system.

9. The method as claimed in claim 8, wherein the continuous waveform modulation time of flight camera system is a photonic mixer device.

10. An apparatus comprising at least one processor and at least one memory including computer program code for one or more programs, the at least one memory and the computer program code configured to, with the at least one processor, cause the apparatus at least to:
project a distance value and position associated with each of a plurality of pixels of an array of pixel sensors in an image sensor of a time of flight camera system onto a three dimensional world coordinate space as a plurality of depth sample points;
de-noise at least one depth sample point of the plurality of depth sample points by adjusting a magnitude of the at least one depth sample point along a unit normal vector, wherein the unit normal vector has a projected direction from a center point of the time of flight camera system through the at least one depth sample point, and wherein the magnitude of the at least one depth sample point along a unit normal vector is determined at least in part by a bilateral filter encompassing further depth sampling points surrounding the at least one depth sampling point; and
merge pixels from a two dimensional camera image with the plurality of depth sample points of the three dimensional world coordinate space to produce a fused two dimensional depth mapped image.

11. The apparatus as claimed in claim 10, wherein the at least one memory and the computer program code causes the apparatus to merge pixels from a two dimensional camera image with the plurality of depth sample points of the three dimensional world coordinate space to produce a fused two dimensional depth mapped image further causes the apparatus to:
  divide the three dimensional world coordinate space into a plurality of Voronoi cells, wherein a seed of each one of the Voronoi cells is one of the depth sample points of the plurality of depth points in the three dimensional world coordinate space;
  determine a nearest Voronoi cell to the position of at least one pixel of the two dimensional camera image; and
  allocate a depth value associated with the seed of the nearest Voronoi cell to the position of the least one pixel of the two dimensional camera image.

12. The apparatus as claimed in claim 11, wherein the at least one memory and the computer program code causes the apparatus to allocate the depth value associated with the seed of the nearest Voronoi cell to the position of the at least one pixel of the two dimensional camera image further causes the apparatus to filter the depth value allocated to the position of the at least one pixel of the two dimensional camera image to produce a further depth value for the position of the at least one pixel of the two dimensional camera image.

13. The apparatus as claimed in claim 12, wherein the at least one memory and the computer program code is further configured, with the at least one processor, to cause the apparatus at least to:
  interpolate the further depth value to the position the seed of the nearest Voronoi cell; and
  determine the difference between the interpolated further depth value and the depth value associated with the seed of the nearest Voronoi cell.

14. The apparatus as claimed in claim 13, wherein the at least one memory and the computer program code is further configured, with the at least one processor, to cause the apparatus at least to allocate the further depth value to the position of the at least one pixel of the two dimensional camera image dependent on the value of the difference between the interpolated further depth value and the depth value associated with the seed of the nearest Voronoi cell.

15. The apparatus as claimed in claim 12, wherein the at least one memory and the computer program code causes the apparatus to filter the depth value further causes the apparatus to filter the depth value with a cross bilateral filter.

16. The apparatus as claimed in claim 10, wherein the plurality of depth sample points projected into a three dimensional world coordinate space form a point cloud.

17. The apparatus as claimed in claim 10, wherein the image sensor of the time of flight camera system is based at least in part on a continuous waveform modulation time of flight camera system.

18. The apparatus as claimed in claim 17, wherein the continuous waveform modulation time of flight camera system is a photonic mixer device.

19. A computer program product comprising a non-transitory computer-readable medium bearing computer program code embodied therein, the computer program code comprising:
  code for projecting a distance value and position associated with each of a plurality of pixels of an array of pixel sensors in an image sensor of a time of flight camera system onto a three dimensional world coordinate space as a plurality of depth sample points;
  code for de-noising at least one depth sample point of the plurality of depth sample points by adjusting a magnitude of the at least one depth sample point along a unit normal vector, wherein the unit normal vector has a projected direction from a center point of the time of flight camera system through the at least one depth sample point, and wherein the magnitude of the at least one depth sample point along a unit normal vector is determined at least in part by a bilateral filter encompassing further depth sampling points surrounding the at least one depth sampling point; and
  code for merging pixels from a two dimensional camera image with the plurality of depth sample points of the three dimensional world coordinate space to produce a fused two dimensional depth mapped image.

* * * * *